Feb. 18, 1958  F. CIVELLO  2,823,630
ROTARY PLOW WITH DISTRIBUTOR
Filed June 10, 1953
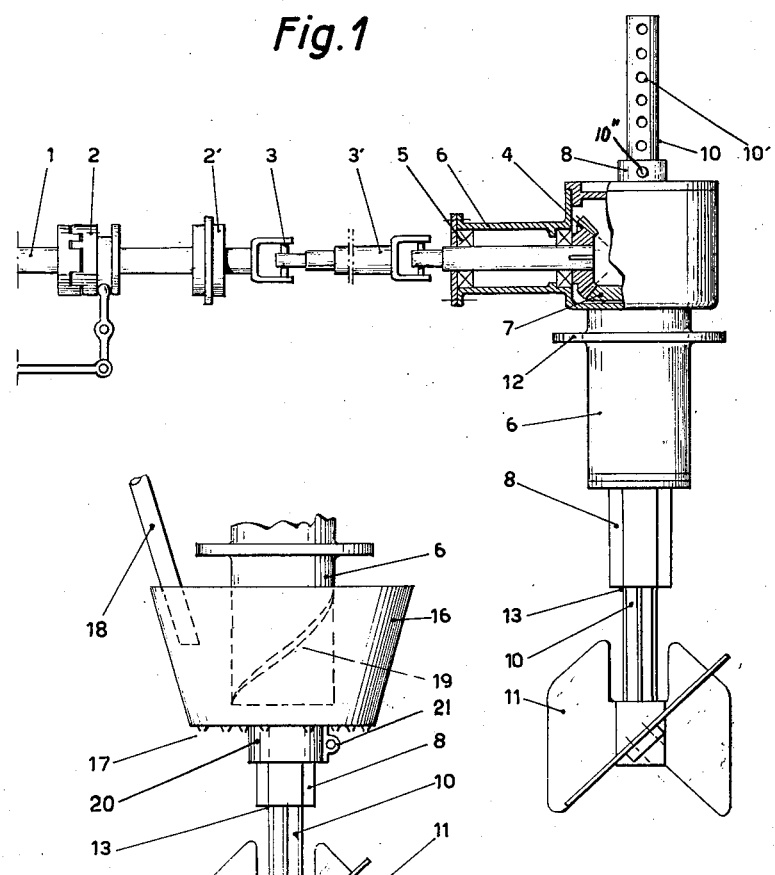

United States Patent Office 2,823,630
Patented Feb. 18, 1958

2,823,630

ROTARY PLOW WITH DISTRIBUTOR

Francesco Civello, Forli, Italy

Application June 10, 1953, Serial No. 360,661

Claims priority, application Italy June 11, 1952

2 Claims. (Cl. 111—74)

The present invention relates to an attachment or apparatus for working the soil by means of rotary tools in combination with means for distributing manure or fertilizers thereto.

The tool or tools are mounted on an L-shaped casing which contains a gear drive for the rotation of the tools and which may be mounted on a carriage or frame which can be secured to the lift of a conventional tractor or to the automatic lift of a plow.

In the apparatus or attachment constructed in accordance with the present invention, the rotary tools are driven by a power take-off from the engine of the tractor or from a separate engine, while means for the distribution of manure or fertilizers are mounted on a rotary hollow shaft projecting from the vertical portion of the aforementioned L-shaped casing.

It is therefore an important object of the invention to provide means affording a very efficient tool attachment to fit any type of tractor and to achieve any desired working depth for the tool connected therewith.

It is another object of the invention to provide means facilitating simultaneously during working of the tool in the soil area the distribution of a liquid fertilizer thereto.

These and other objects of the invention will become further apparent from the following detailed description, reference being made to the accompanying drawing showing a preferred embodiment of the invention.

In the drawing:

Fig. 1 is a side view partly in section of the drive mechanism for operating the rotary tools; and Fig. 2 represents the lower part of the apparatus of Fig. 1 used in conjunction with a manure distributor constructed in accordance with the present invention.

Referring now more particularly to the drawing, there is shown in Fig. 1 a shaft 1 connected by any suitable attachment to the power take-off of the tractor (not shown) which rotates a bevel gear 4 through a telescopic shaft 3', a clutch 2, a flexible joint 2' and a universal joint 3. The shaft of said gear is rotatable in thrust bearings 5 contained in a casing 6. A bevel gear 7 meshes with the bevel gear 4 forming therewith an angle of 90°, gear 7 being welded to a hollow shaft 8 which revolves in bearings (not shown) and has an internal polygonal or non-cylindrical section for driving a tool holder shaft 10 housed therein. Moreover, at its lower part, said hollow shaft 8 is of polygonal cross-section both inside and outside for transmitting motion to other elements as will be explained hereinafter.

At its lower end shaft 10 is fitted with a hub supporting a tool 11, while at its upper end shaft 10 is provided with stop means for the regulation of the working depth.

According to the example illustrated in the drawing, several holes 10' are provided on the shaft 10 at different heights to receive suitable cotter pins 10", which are inserted through one of said holes 10' and through corresponding holes in the hollow shaft 8.

L-shaped casing 6 is fixed by means of a plate 12 to a carriage or frame allowing the attachment of the casing to a tractor. Hollow shaft 8 is of considerable length extending downwardly through suitable bearings (not shown) to the shaft end 13, so that only a relatively short length of the tool holder shaft 10 projects beyond said hollow shaft 8, even at the greatest ploughing depth, thereby protecting said tool holder shaft.

By such arrangement of the two shafts 8 and 10 it is possible to apply to the device a manure distributor in accordance with the present invention.

As appears from Fig. 2 a rotary bell or hopper 16 is fixed to the hollow shaft 8 and is provided at its bottom with adjustable outlets or ports 17. From a source fixed to the carriage or frame (not shown), manure is poured into said hopper by means of tube 18, while blades 19 fixed to the casing 6 mix said manure and lead it to the ports 17.

To secure said rotary hopper 16 to the rotary hollow shaft 8, a collar 20 is provided, which collar is cut along one generatrix and welded or otherwise fixed to the bottom of said rotary hopper and then locked by a bolt 21.

Various changes and modifications may be made without departing from the spirit and scope of the present invention and it is intended that such obvious changes and modifications be embraced by the annexed claims.

Having thus described the invention, what is claimed as new and described to be secured by Letters Patent, is:

1. An attachment for rotary plows and like agricultural devices to be used in conjunction with farm tractors and similar vehicles; comprising substantially horizontal, flexible, rotatable shaft means for operative connection with said tractor, a casing spaced from said tractor, said casing having a horizontal section adapted to rotatably carry an end portion of said horizontal shaft means and having a downwardly extending vertical section, substantially vertical, rotatable hollow shaft means passing through said vertical casing section, gear means within said casing and adapted to transmit motion of said horizontal shaft means to said vertical shaft means, a tool holder shaft operatively connected to and concentric with said hollow shaft means and adjustable as to its height with respect to the latter, a tool secured to the lower end of said tool holder shaft, blade means on said vertical casing section, and hopper means on said hollow shaft means and rotatable therewith, said hopper means extending about said blade means and being provided with downwardly directed outlets, whereby fertilizer when fed to said hopper means will be mixed therein by said blade means upon rotation of said hopper means and conducted to said outlets so as to fall to the ground area therebelow to be worked upon by said tool.

2. An attachment according to claim 1, said blade means being spiral-shaped.

References Cited in the file of this patent

UNITED STATES PATENTS

| | | |
|---|---|---|
| 334,223 | Flatau | Jan. 12, 1886 |
| 1,230,964 | Wheat | June 26, 1917 |
| 1,620,510 | Beise et al. | Mar. 8, 1927 |
| 1,697,677 | Davidson | Jan. 1, 1929 |
| 1,729,969 | Shields | Oct. 1, 1929 |
| 2,532,424 | Rose | Dec. 5, 1950 |
| 2,638,042 | Barstow et al. | May 12, 1953 |